United States Patent [19]

Bratton

[11] Patent Number: 4,835,512
[45] Date of Patent: May 30, 1989

[54] STEERING WHEEL HIGH BEAM HEADLIGHT INDICATOR

[76] Inventor: Daniel W. Bratton, 3633 - 33rd Ave. South, Minneapolis, Minn. 55406

[21] Appl. No.: 165,157

[22] Filed: Mar. 7, 1988

[51] Int. Cl.⁴ .................................... B60Q 11/00
[52] U.S. Cl. ........................ 340/457.2; 340/458; 362/61
[58] Field of Search ............... 340/52 R, 22, 52 D, 340/79, 80, 54; 307/10 R, 10 LS; 362/80, 61

[56] References Cited

U.S. PATENT DOCUMENTS

| | | |
|---|---|---|
| 2,350,599 | 6/1944 | Feldheim . |
| 4,368,454 | 1/1983 | Pilatzki ................................ 340/22 |
| 4,421,960 | 12/1983 | Arima et al. . |
| 4,485,371 | 11/1984 | Yamada et al. . |
| 4,518,836 | 5/1985 | Wooldridge . |
| 4,578,592 | 3/1986 | Nakazawa et al. . |
| 4,608,550 | 8/1986 | Umebayashi et al. ............... 340/22 |
| 4,616,224 | 10/1986 | Reighard ....................... 307/10 R X |
| 4,638,131 | 1/1987 | Kidd et al. . |

FOREIGN PATENT DOCUMENTS

87/06893 11/1987 World Int. Prop. O. ............ 340/22

*Primary Examiner*—Joseph A. Orsino
*Assistant Examiner*—Brian R. Tumm
*Attorney, Agent, or Firm*—Orrin M. Haugen; Thomas J. Nikolai; Frederick W. Niebuhr

[57] ABSTRACT

An apparatus for indicating that a motor vehicle's headlamps are in their high beam condition. Rather than mounting a light source on the dashboard as conventional, the indicator light is mounted in the top center portion of the vehicle's steering wheel with the wiring therefore routed through the rim and spokes of the steering wheel to the steering column.

7 Claims, 1 Drawing Sheet

STEERING WHEEL HIGH BEAM HEADLIGHT INDICATOR

BACKGROUND OF THE INVENTION

I. Field of the Invention

The present invention is directed to an improved high beam headlight indicator and, more specifically, to a high beam headlight indicator mounted dead center on the top of the steering wheel facing the driver of a vehicle. A colored lens protecting the bulb of the indicator is inlaid flush on the steering wheel so that the presence of the indicator on the steering wheel does not disturb the smooth contour of the steering wheel or inhibit one's ability to steer the vehicle.

II. Discussion of the Prior Art

A feature common to nearly all domestic and foreign automobiles are headlights on the vehicle having three modes of operation—off, low beam, and high beam. The high beam mode significantly increases the driver's ability to perceive and observe road conditions while driving at night. However, the high beam mode can significantly impair the ability of the drivers of oncoming vehicles to see. It is for this reason that vehicles having both high and low beam headlights are typically equipped with a high beam indicator light inside the vehicle. This indicator light, which in prior art motor vehicles is typically located on the dashboard, is provided to remind drivers to switch the mode of operation of their headlights when oncoming traffic is approaching. While location of the high beam indicator on the dash is typical, this is not necessarily the best location. First, when mounted on the dash, along with other lighted displays and indicators, the high beam indicator can blend in with the other displays and indicators, thus loosing its prominence. Second, if placed on the dash, the indicator can become obscured by other vehicle equipment, such as the steering wheel, gear shift lever or turn signal lever. When such situations arise, a driver can forget to switch the mode to low beam, creating a hazard for oncoming vehicles. Moreover, an oncoming driver, when facing a high beam from another vehicle will switch his own lights to high beam to signal or retaliate against the first driver. This can temporarily impair the first driver's vision and could contribute to an accident. This, in turn, creates in many drivers a reluctance to use the high beam setting even when safe driving practices suggest its use.

While most vehicles in common used today locate the high beam indicator somewhere on the dashboard of the vehicle, at least one patent, U.S. Pat. No. 2,350,599 which issued on June 6, 1944 to E. F. Feldheim, attempts to address the problem by locating the high beam indicator so that it reflects its light off the windshield of the vehicle into the driver's eyes. While the high beam indicator light arrangement of Feldheim may solve the problem of lack of visibility, it suffers from the problem of being too directly in the driver's line of sight when he is operating the vehicle. The high beam indicator of Feldheim may preclude the driver from being able to properly view the road conditions as he proceeds with driving.

Although numerous patents have used all or part of the steering wheel assembly for control devices and instrument displays, the steering wheel high beam indicator uniquely takes advantage of the steering wheel's qualities as a control or indicator platform. Further, these patents generally consider the rotational movement of the steering wheel to be a disadvantage and seek to neutralize it through a variety of mechanical innovations. Unique among instruments commonly displayed on a dashboard, high beams and the attendant indicator light are generally only engaged at high speeds. Since at high speeds the wheels of the car are oriented straight ahead or close to straight ahead, the high beam indicator light would remain in the upper quadrant of the steering wheel when engaged. The steering wheel high beam indicator is, in fact, more effective for the attention slight steering wheel movement brings to the indicator light when the high beams are engaged. Proximity to the driver's eyes and movement of the light combine to ensure maximum driver awareness that the high beams are engaged.

SUMMARY OF THE INVENTION

In accordance with the present invention, the high beam indicator is located on the top center portion of the rim of the steering wheel. In this position, it is more directly in the driver's line of sight than when located on the dashboard. Similarly, it is separated from other displays and indicators on the vehicle so that it is more prominent. Also, it is not so directly located in line of the driver's sight through the vehicle's windshield so that it would cause him or her to be distracted or to be unable to see and observe the road conditions. Thus, the present invention promotes road safety in at least two ways. First, it is better capable of reminding drivers when the high beam lights are on so that they can be switched to the low beam mode when traffic approaches. Second, since a driver would not have to worry about forgetting to change the mode of operation when traffic approaches, he or she can utilize the high beam headlights to better view the road conditions with greater confidence when there is no or only sporadic oncoming traffic.

In addition to the advantages of the present invention set forth above, by mounting the high beam indicator at the top of the steering wheel in accordance with the present invention, the high beam indicator lamp becomes the most easily observed and the most readily apparent indicator displayed in the car. Moreover, the constant steering adjustments necessary to keep the vehicle moving straight ahead cause the light to move, further attracting attention to its presence. No other high beam indicator design known to the applicant affords this degree of driver awareness without being obtrusive or distracting. Finally, by mounting the lens of the indicator flush with the steering wheel and utilizing for the lens a color similar to the color of the steering wheel, such as a dark blue lens and a black steering wheel, it becomes quite unobtrusive and the driver is unaware of the presence of the high beam indicator except when it is on.

DETAILED DESCRIPTION OF THE PREFERRED EMBODIMENT

Figure 1:
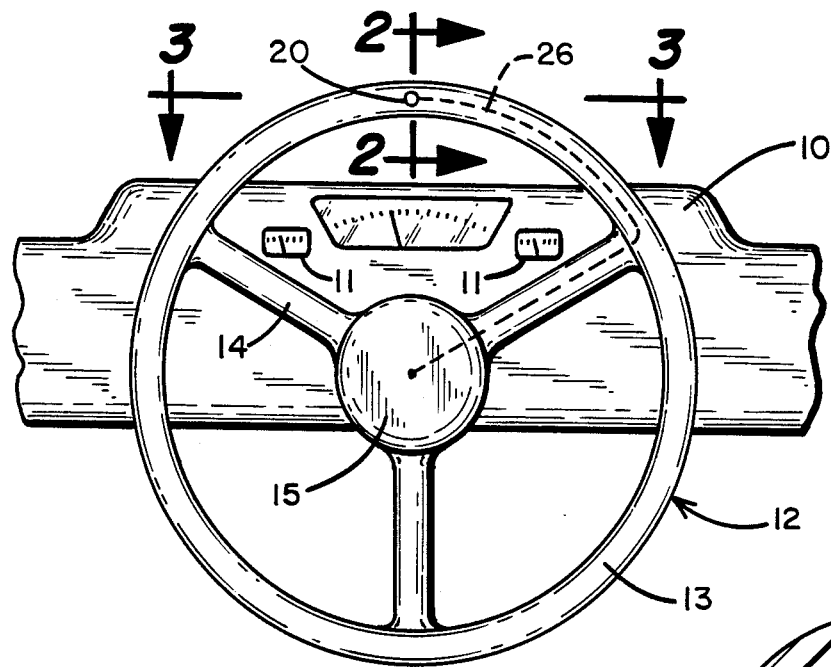
FIG. 1 shows a steering wheel equipped with the high beam indicator of the present invention.

A portion of a typical automobile dashboard 10 having a plurality of instrument displays 11 and a steering wheel 12 is shown in FIG. 1. Steering wheel 12 is typical of those in common use today having a rim 13, a plurality of spokes 14 and hub 15. Steering wheel 12 is mounted to the steering column (not shown) of the vehicle in the standard manner.

Figure 2:
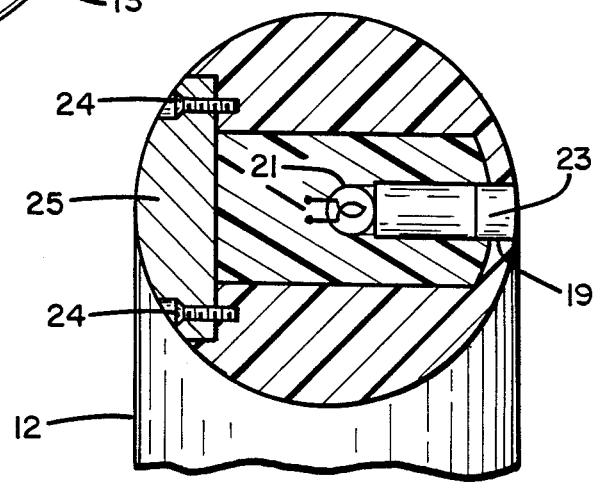
FIG. 2 is a cross-sectional side view of a steering wheel equipped with the high beam indicator of the present invention taken along line 2—2 in FIG. 1.
Figure 3:
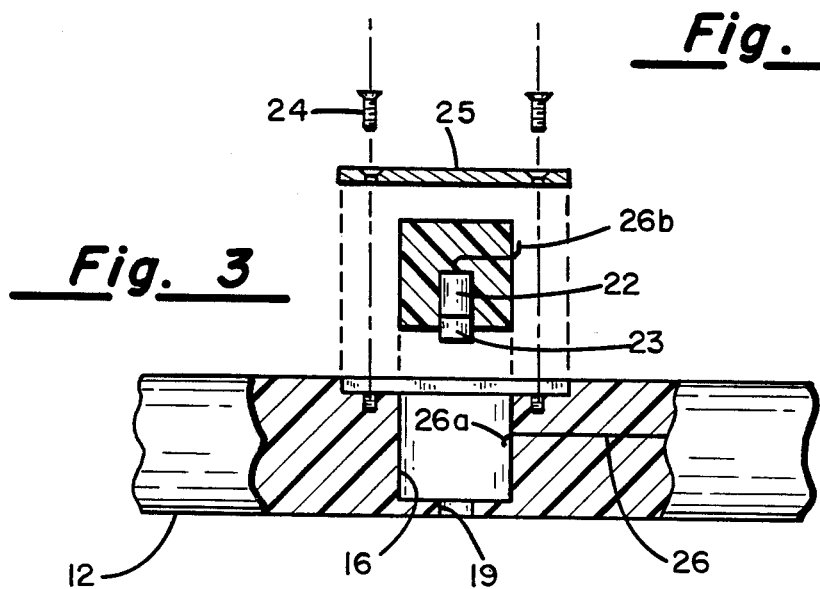
FIG. 3 is a cross-sectional view of a steering wheel equipped with the high beam indicator of the present invention taken along line 3—3 in FIG. 1.

As shown in FIG. 1, consistent with the teachings of the present invention, there is an indicator 20 mounted on the front face surface and at the top center of the rim 13 of the steering wheel 12 when the vehicle's wheels are in a straight-ahead position. FIGS. 2 and 3 show that indicator 20 is comprised of a source of radiation, e.g., a light bulb 21, disposed in an electrical socket 22 for holding and providing an electrical connection for light bulb 21 and a lens 23. The socket 22 and the bulb 21 are positioned in a pocket 16 formed in the rim 13 of steering wheel 12. An opening 19 extends from the pocket 16 to the exterior surface of the steering wheel's rim.

Lens 23, typically formed of a transparent or translucent, colored plastic, is designed to both cover the bulb and socket in such a way that it is flush with the outside surface of the rim of the steering wheel so as to not interrupt the general contour of the steering wheel. Lens 23 can be secured to the steering wheel in any of a number of ways. While the drawings show it being held in place by screws 24 passing through a back-up plate 25, those skilled in the art will appreciate that the tolerances of the pocket 16 and the lens 23 can easily be established to form a friction snap fit between the mating parts.

Providing the wire connection from the high beam switch to energize the socket 22 and the bulb 21 is not difficult. The necessary wiring can be run from the origin through the steering column (not shown) to the hub 15 of the steering wheel 12 in a fashion similar to the wiring for the car horn. From the hub 15 of the steering wheel 12 it is then run through one of the spokes 14 of the wheel 12 to the rim 13 and through the rim 13 to the socket 22 along the path represented by dotted line 26 in FIG. 1.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. For use in conjunction with a vehicle of the type including a steering wheel having a rim, at least one spoke, and a hub, headlights having a high beam mode and a low beam mode, headlight mode indicator means comprising:
   (a) a pocket in said steering wheel rim having an opening extending to the exterior surface of said steering wheel rim; and
   (b) a light emitting device located within said pocket and visible through said opening, said light emitting device being illuminated when the headlights are in the high beam mode and not illuminated when the headlights are in said low beam mode.

2. The apparatus of claim 1 wherein said pocket is located at the top center of the steering wheel rim and said opening is in the forward face of said steering wheel rim.

3. The apparatus of claim 1 and further including a translucent lens disposed in said opening.

4. The apparatus of claim 3 wherein said translucent lens is of the same color as the color of the steering wheel rim when the light emitting device is unlit.

5. The apparatus of claim 3 wherein said lens is flush with the surface of said steering wheel rim.

6. The apparatus as in claim 1 wherein said light emitting device is an incandescent bulb.

7. The apparatus as in claim 6 and further including an electrical socket disposed in said pocket, said incandescent bulb being electrically connected to said socket, and a conductor means connected to said socket, said conductor means being embedded in the rim, spoke and hub of said steering wheel.

* * * * *